United States Patent [19]

Hughes

[11] 4,137,094
[45] Jan. 30, 1979

[54] CONTINUOUS PRODUCTION OF STARCH HYDROLYSATES

[76] Inventor: John F. Hughes, 91 Davignon, Dollard des Ormeaux, Quebec, Canada

[21] Appl. No.: 868,921

[22] Filed: Jan. 12, 1978

Related U.S. Application Data

[63] Continuation of Ser. No. 767,794, Feb. 11, 1977, abandoned, which is a continuation-in-part of Ser. No. 667,170, Mar. 15, 1976, abandoned.

[51] Int. Cl.$^2$ ............................................. C13K 1/06
[52] U.S. Cl. .......................................... 127/38; 127/1;
127/28; 127/29; 127/32
[58] Field of Search ................... 127/1, 28, 29, 32, 38

[56] References Cited

U.S. PATENT DOCUMENTS

| | | | |
|---|---|---|---|
| 1,425,497 | 8/1922 | Merrill | 127/1 |
| 1,516,512 | 11/1924 | Stutzke | 127/38 X |
| 2,233,243 | 2/1941 | Burns | 127/1 X |
| 2,304,679 | 12/1942 | Christensen | 127/1 X |
| 2,337,688 | 12/1943 | Sipyaguin | 127/1 |
| 2,735,792 | 2/1956 | Kroyer | 127/1 |
| 2,946,706 | 7/1960 | Boon | 127/38 |
| 2,954,304 | 9/1960 | Kroyer | 127/38 X |
| 3,756,853 | 9/1973 | Meyer | 127/38 |

Primary Examiner—Sidney Marantz

[57] ABSTRACT

A continuous process for the production of starch hydrolysates, such as corn syrup. The process comprises continuously moving an aqueous acidic starch slurry feed containing at least about 35% by weight starch solids through a confined preheat zone at a pressure of at least 300 psi to raise the temperature of the slurry to at least 140° C, continuously forcing the hot fluid mass emerging from the preheat zone through an elongated compressing zone, continuously receiving the fluid material emerging from the compressing zone in the form of a fine spray or mist including water vapor in a confined zone of reduced pressure and continuously collecting from said reduced pressure zone a homogeneous starch syrup having a higher solids content than the starch slurry feed. The temperature and pressure within the elongated compressing zone can be controlled to selectively provide syrup products having a wide range of DE values.

8 Claims, 4 Drawing Figures

CONTINUOUS PRODUCTION OF STARCH HYDROLYSATES

This is a continuation of application Ser. No. 767,794, filed Feb. 11, 1977, abandoned, which is a continuation-in-part of Ser. No. 667,170, filed Mar. 15, 1976, abandoned.

BACKGROUND OF THE INVENTION

This invention relates to the production of starch hydrolysates such as glucose syrups, maltodextrins and dextrose.

It has long been known to convert starch with dilute acid and/or enzymes so as to make syrup, and the annual production of starch syrup in the United States is over 3 billion pounds per year. Typical processes of the known type are described in Langlois, Canadian Patent No. 618,164 and Barton et al. Canadian Patent No. 753,227. Because of its greater commercial importance and availability, corn starch is used to the greatest extent for conversion into syrup and starch syrups are for the most part corn syrups.

Starch syrups which are manufactured by a straight acid conversion process correspond closely in properties when converted to the same degree. For example, corn syrup produced by straight acid conversion, having a dextrose equivalent (DE) of 42%, will be found to contain about 22% dextrose, 20% maltose, 20% higher sugars and 38% dextrins. All 42 DE corn syrups prepared by acid hydrolysis have essentially the same composition. Likewise, starch syrup manufactured by the combination acid and enzyme conversion process will correspond fairly closely in properties, although this type of process affords a wider range in the properties obtained, depending on the ratio of the conversion obtained by the acid step to that obtained by the enzyme converting step.

Generally starch hydrolysis products, such as syrups can be divided into four components, namely: dextrose, a monosaccharide; maltose, a disaccharide; higher sugars, which include the trisaccharides and tetrasaccharides; and dextrins, which include all polymers higher than tetrasaccharides. Dextrose represents the ultimate degree of conversion or hydrolysis of starch, whereas dextrins represent the smallest degree of conversion or hydrolysis. Maltose and the higher sugars represent intermediate degrees of conversion or hydrolysis.

Both the chemical and physical properties of any particular starch syrup will depend primarily upon its particular content of these four main components. Since dextrose is sweeter than maltose, and maltose is sweeter than the higher sugars and dextrins, which are nearly tasteless, it follows that the higher dextrose-maltose content a syrup has, the sweeter it will be. The maximum sweetness is attained in a syrup having maximum dextrose content. On the other hand, dextrins are composed of relatively large molecules and therefore dextrins contribute viscosity or body to a syrup, whereas dextrose and maltose molecules do not. A syrup which has a high dextrin content will have a greater viscosity and will have more body to it than one which has a low dextrin content. In addition to sweetening power and viscosity or "body," which have been mentioned, other important properties of syrups include reducing power, humectant character, fermentability, osmotic pressure and freezing point, depending upon the use which is to be made of the syrup.

The technology of enzymes in the production of starch hydrolysates has been developed to a high degree in recent years. Thus, one widely used procedure is to use a combination acid and multiple enzyme conversion process while other procedures involved the use of enzymes both for liquefaction and saccharification.

Starches are, of course polymers of anhydroglucose units which are linked through alpha-glucosidic bonds. Most starches contain two types of polymers, namely amylose and amylopectin. The former is a linear polymer in which the monomeric units are linked essentially through alpha-1, 4-glucosidic bonds. The presence of hydroxyl groups in the amylose chain imparts hydrophilic properties to the amylose polymer which leads to an affinity for moisture and resulting solubility in hot water. However, since the amylose molecules are linear and contain hydroxyl groups, they have a tendency to be attracted to each other and to align themselves by the association, as, for example, by hydrogen bonding, through the hydroxyl groups on neighbouring molecules. When this occurs, the affinity of the amylose polymers for water is reduced and, if the molecules are in solution, they will tend to come out of solution forming precipitates at dilute concentrations. These precipitates consist of three dimensional polymeric networks held together by spot hydrogen bonding particularly at higher concentrations where the motion of the amylose polymers and their ability to orient is more restricted. This phenomenon of molecular association through hydrogen bonding as manifested by crystallization from aqueous dispersions is commonly referred to as "retrogradation." Thus, for example, the tendency of corn starch dispersions to become opaque on cooling and to form gels is a result of retrogradation of the amylose molecules which are present in the corn starch.

Amylopectin, the other polymer which is present in the starch molecule, contains a predominance of 1,4 linked anhydroglucose units, but in addition, at about every 15th anhydroglucose unit there is a branch point extending from the 6th position of the anhydroglucose unit to the 1 position of the branching chain. Amylopectin is a larger polymer than amylose, and is believed to attain molecular weights in the millions. The highly branched structure of amylopectin keeps its molecules from approaching each other closely enough to permit the extensive hydrogen bonding necessary for retrogradation to occur. As a result, aqueous sols of amylopectin, or starches wherein amylopectin is the primary or sole component, are characterized by good clarity and stability.

One of the problems with enzymes in hydrolyzing starch is that most enzymes are unable to act on the retrogradation products. Moreover, there are many different enzymes capable of hydrolyzing the glucosidic linkages in the starch molecules, but most of these enzymes are unable to hydrolyse all of the 1,4 or 1,6 bonds. Either an equilibrium condition occurs at a certain degree of conversion or the enzyme is incapable of hydrolyzing certain specific linkages at various loci in the amylose or amylopectin chain. Another disadvantage of certain enzyme systems is that they contain trans-glycosidase activity which results in the synthesis of appreciable amounts of di- or trisaccharides from dextrose or maltose, thereby preventing complete hydrolysis to dextrose. It is also believed that these problems are compounded by the fact that the starch molecules have a curled or spiral configuration which interferes with ready access by the enzymes to the reactive points where hydrolysis would normally occur.

It is an object of the present invention to provide an improved process for producing starch hydrolysates of the above type.

SUMMARY OF THE INVENTION

According to this invention it has been found that starch can be hydrolyzed to produce hydrolysates having a Dextrose Equivalent (D.E.) ranging between about 5 and 98 by a method which involves continuously moving an aqueous slurry of starch and acid containing at least about 35% by weight starch solids and at a pressure of at least 300 psi through a confined preheat zone and forcing the hot fluid mass emerging from the preheat zone at a temperature of at least 140° C. through an elongated compressing zone, said elongated compressing zone having a cross-sectional area less than 25% of the cross-sectional area of the preheat zone and a length:diameter ratio of at least 4:1, continuously receiving material emerging from the compressing zone in the form of a fine spray or mist including water vapor in a confined zone of reduced pressure and continuously collecting from said reduced pressure zone a homogeneous starch syrup having a higher solids content than the starch slurry feed, the temperature and pressure within the compressing zone being selectively controlled to provide syrup products of predetermined DE values.

DESCRIPTION OF THE PREFERRED EMBODIMENTS

The preheat zone can be of any desired configuration provided it is capable of maintaining a continuous flow of material. For instance, it can be a heat exchange tube through which the material is being driven by means of a pump or it may be in the form of a vessel containing a screw feed for continuously moving the material. There must be sufficient residence time within the preheat zone for the materials to reach reaction temperature and also to permit the material to pass through a gel stage and return to a liquid stage before entering the first compressing confining zone.

The elongated compressing zone must have a cross-sectional area significantly smaller than the cross-sectional area of the preheat zone and must have substantial length relative to its cross-sectional area so that there is a very high energy input into the hot fluid mass passing through the compressing zone. By proper selection of temperature, pressure and relative dimensions, the hot fluid mass emerges from the compressing zone into a zone of reduced pressure in the form of a fine spray or mist, which includes water vapor.

It has also been found to be important that the outlet of the confining zone be shaped such that the vapor flare emerges in a relatively free flow with substantial freedom from vortex. Otherwise, the system quickly becomes plugged at the outlet of the confining zone.

The working temperature within the elongated confining zones are preferably 140° C. or higher temperatures in the range of 170°–200° C. being particularly preferred.

The pressure on the inlet side of the preheat zone is usually at least 300 psi, preferably 500–1000 psi. The upper limit is largely determined by the capability of the feed pump being used to pump the slurry through the system. There is a very marked pressure drop across each elongated confining zone and, for instance, it may drop from 750 psi on the inlet side of a confining zone to about 250 psi on the outlet side.

As has been stated above, it is essential that the material be continuously moved through the system but the actual rate of travel varies widely. For instance, in a typical system the slurry may travel through the preheat zone at a speed of about 3–5 feet per second and a similar speed for the material is typical in the intermediate zone of reduced pressure. On the other hand, in order to achieve the high energy input within the compressing zone, the material must travel at very high speeds in this region.

According to a preferred embodiment, at least two compressing zones are utilized in series so that the hot fluid mass from the preheat zone is forced through a first elongated compressing zone, from which it emerges as a fine spray or mist into an intermediate zone of reduced pressure where it forms into a liquid. This liquid is continuously moved through the intermediate zone and is forced through a second elongated compressing zone from which it again emerges as a fine spray or mist into a zone of reduced pressure where it once again forms into a liquid. Additional elongated compressing zones can be included in similar sequence if required.

In a typical two stage operation there is a pressure drop from 700 psi to 200 psi across the first compressing zone and a pressure drop from 200 psi to ambient pressure across the second compressing zone. With this sudden decrease in pressure, some water vapor flashes off in the form of steam, and preferably sufficient steam flashes off to increase the solids content of the product by at least 10% by weight as compared with the starch slurry feed.

With the above system, it has surprisingly been found that starch hydrolysates can be produced having a wide range of D.E. values. By varying the reaction temperatures and pressures and by varying the acidity of the starch slurry, D.E. values from as low as 5 to 10 can be obtained up to values of 98 or more. It has also been found that a very accurate control of D.E. values is possible by maintaining a constant pressure and simply varying temperature.

The product which is obtained is a light amber liquid usually having a solids content in the range of about 55–65% by weight. The liquid is easily clarified by first neutralizing it to a pH of about 5.5 to 6.5, for example by addition of calcium carbonate. This causes undesirable materials to precipitate and these are readily removed by filtering or centrifuging. The separated liquid has a clear amber colour which can be completely removed by passing the liquid through activated carbon.

Previous acid hydrolysis systems for starch not only lacked flexibility in being able to produce a wide range of D.E. values during acid hydrolysis, but also usually produced a product having a solids content no higher than about 30–32%. Commercial syrups normally have a solids content of about 55% and this means that such product from hydrolysis must be concentrated, e.g. by means of a triple-effect evaporator to reach the desired 55%. Syrups with a solids content of 55% and a wide variety of D.E. values can be produced directly by the process of this invention.

It is believed that the differences in the reaction according to this invention as compared with the prior art has to do with the very high levels of thermal and mechanical energy which are being imparted to the starch molecule during its passage through the elongated compressing zone. Starch in its natural state tends to have a highly curled or spiral configuration which interferes with ready access to the reactive points where hydrolysis would normally occur. However, on passing through the elongated compressing zone at elevated temperatures and pressures, it is believed that a substantial proportion of the curl is removed from the starch molecules, thereby exposing more reactive points for hydrolysis. With a ready access to many more reactive points, it then becomes possible to control the degree of hydrolysis and hence the DE value by the control of such reactive conditions as the degree of acidity and reaction temperature and pressure. The opening of the starch molecule by removal of the curl also overcomes one of the most difficult problems in the use of enzymes and provides ready accessability to a wide range of reactive sites.

The starch raw material adaptable to the process can be selected from a wide variety of waxy and non-waxy starches. Corn starch is particularly desirable because of its ready avaliability but other starch sources such as potato, wheat, tapioca, rice, etc. are equally satisfactory.

The slurry being fed to the system ususally contains about 35 to 75% starch solids, although slurries containing more than about 55% solids produce a very viscous product which becomes difficult to handle in further processing. The slurry can be acidified with an inorganic or organic acid. Typical of the inorganic acids that can be used are sulphuric acid, hydrochloric acid and phosphoric acid, while typical organic acids that are suitable include citric, lactic and acetic acid. Hydrochloric acid is particularly convenient and is preferably used in an amount of about 0.025%–0.25% by weight based on dry weight of starch, about 0.1 to about 0.15% being particularly preferred.

The reactor includes a preheat zone, an elongated compressing zone and a zone of reduced pressure, as well as a means for continuously moving a slurry through the reactor. The preheat zone can be in the form of a tube connected to a feed pump or it can be in the form of a vessel containing a worm drive or similar drive for continuously moving the slurry therethrough under heat exchange conditions. The outlet of the preheat zone connects to the elongated compressing zone which is conveniently in the form of an elongated orifice or capillary venturi. This orifice typically has a cross sectional area not greater than about 25% of the cross-sectional area of the preheat zone, resulting in a greatly increased speed of travel of the slurry material within the orifice, and, by providing an orifice of substantial length relative to its cross-sectional area, the frictional drag resulting from the high surface to volume ratio creates a very high frequency turbulence within the flowing material. The length:diameter ratio of each individual orifice should be at least 4:1 and is preferably at least 20:1. The region of reduced pressure following the orifice can be most any kind of vessel and is typically a further tubular member. This further tubular member can serve as an intermediate zone which is then followed by a further orifice. The inlet to the preheat zone is preferably connected to a pump capable of pumping a high solid starch slurry through the system at high pressure.

The tubular members are preferably arranged as coils immersed in a heat exchange bath. However, other heating means can be used such as electric heating mantles, steam jackets, microwave units, etc. The intermediate tubular member usually does not have a cross-sectional area greater than that of the preheat zone and may have an area less than that of the preheat zone. It is also preferable for the second orifice to have a smaller diameter than the first orifice.

The orifice between each adjacent pair of tubular members may be either a single orifice or a series of orifices in a block. It may also be desirable to provide a bulbous portion adjacent the outlet of each orifice or orifices to allow proper discharge of the vapor flare from the orifice.

Certain preferred embodiments of the present invention are illustrated by the attached drawings in which.

Figure 1:
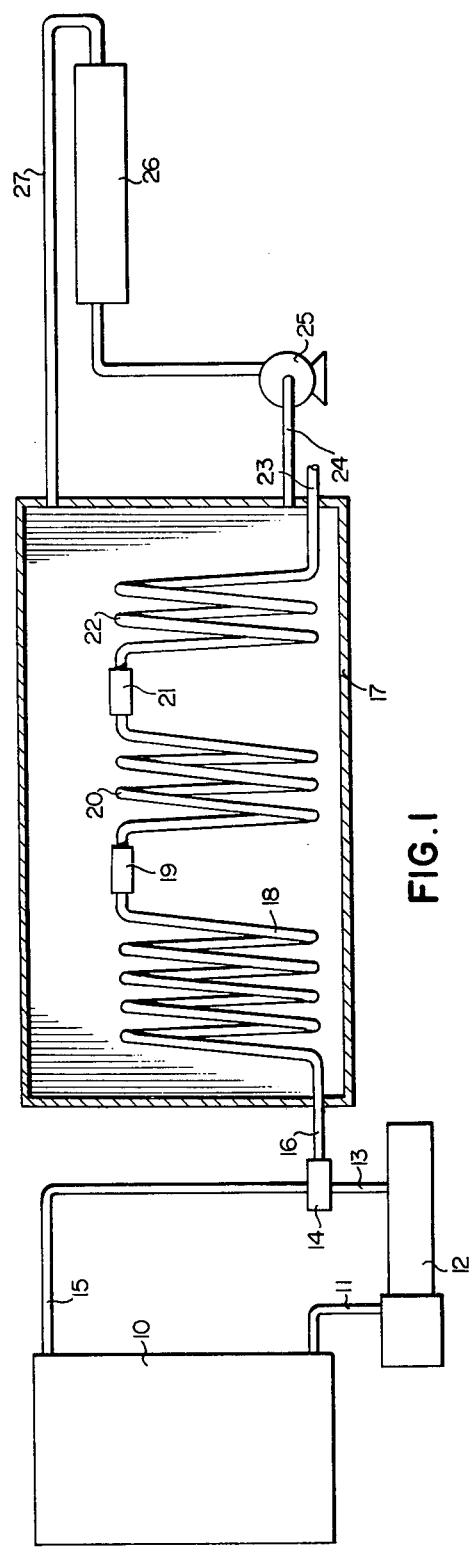
FIG. 1 is a schematic flow sheet showing apparatus for carrying out the invention.

As will be seen from FIG. 1, a holding tank 10 is provided for a starch slurry feed. This tank has an outlet 11 which feeds into a Moyno pump 12. The slurry is pumped out of pump 12 through line 13 at high pressure and through a high pressure diverter valve 14.

The valve 14 is used to regulate the pressure in the inlet 16 to the reactor 17. This is done by bleeding off a portion of the slurry through line 15 and recycling it back into tank 10.

The main reactor 17 is a closed and insulated vessel substantially filled with a heat exchange fluid such as Therminol 66, available from the Monsanto Company.

A ⅛ inch diameter stainless steel pipe is used as the reactor tube and this is made up in the form of three coiled portions 18, 20 and 22. Coil 18, which connects to inlet 16, represents the preheat zone and has a length of about 60 feet. Coil 20 is the intermediate reaction and heating zone and has a length of about 40 feet while coil 22 represents a finishing zone where the reaction is completed and has a length of about 20 feet.

Mounted between coils 18 and 20 is an orifice member 19 while a second orifice member 21 is mounted between coils 20 and 22. It is also possible to use a simplified version in which the coil 20 and orifice 21 are eliminated so that the outflow from orifice 19 goes directly to coil 22. It is also possible to use more than two orifices in sequence with an intermediate coil section similar to coil 20 being used between each pair of orifices.

Looking at an orifice member in greater detail, it can be seen that it has a main body portion 29 made from the stainless steel block with cylindrical recesses 33 and 34 for receiving the ends of tubes 20 and 18 respectively. Extending through the length of the body 29 is an orifice hole 30 having a length of about 3.4 inches. In this particular embodiment, the orifice hole 30 of orifice member 19 has a diameter of 0.101 inch while that of orifice member 21 has a length of 3.4 inches and a diameter of 0.093 inch.

To smooth the flow of starch slurry into the orifice hole 30, there is provided an inwardly flared inlet portion 31. There is also provided an inwardly flared outlet portion 32 which has been found to also improve the flow. Thus, it has been found that if this flaring on the outlet is not provided, there is a fairly rapid build up of solid material in the vicinity of the outlet. With the flared outlet this does not occur and the slurry emerges in the form of a puff of vapour 35 which then transforms into a homogeneous liquid. A similar action occurs in orifice 21 with the vapour again forming into a liquid in the coil 22 and a homogeneous liquid product emerging through outlet 23.

The temperature within the reaction zone is controlled by means of the heat exchange fluid in the vessel 17. Heat is applied to the heat exchange fluid by recycling the fluid via line 24 and pump 25 through an electric heating unit 26 and back into vessel 17 via return line 27. With the heat exchange fluid in vessel 17 being maintained at a predetermined temperature, starch slurry entering through inlet 16 at ambient temperature is heated during its passage through the preheat coil 18 to a temperature which is usually within about 20° C. of the bath temperature. More heat is received during the passage of the fluid through coil 20 so that the material passing through orifice 21 has a temperature about 10° C. less than the bath temperature.

Further details of the orifices and their operation can be found in copending application Ser. No. 585,810 filed June 11, 1975, which is incorporated herein by reference.

The following examples are further illustrative embodiments of this invention. All parts and proportions are by weight unless otherwise specified.

EXAMPLE 1

Figure 2:
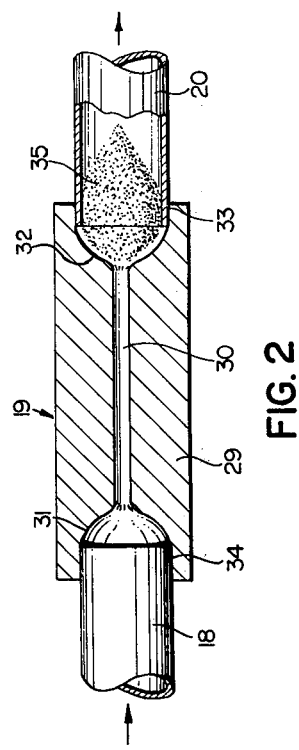
FIG. 2 is a partial sectional view of an orifice.

The process was carried out using the reactor described in FIGS. 1 and 2. The coils 18, 20 and 22 were all made from ½ inch diameter stainless steel tubing, with the first coil having a length of 60 feet, the second coil having a length of 40 feet and the third coil having a length of 20 feet. The first orifice had a diameter of 0.101 inch and a length of 3.4 inches and the second orifice had a diameter of 0.093 inch and a length of 3.4 inches. The bath temperature was 225° C.

A starch slurry was formed from 100 pounds pearl corn starch, 105 pounds water and 200 mls of hydrochloric acid (37% HCl). Using a Moyno pump, this slurry was pumped through the reactor at a reactor tube inlet pressure of 500 psi and a bath temperature of 225° C. The flow rate through the reactor tube was about 1.3 Imperial gallons per minute. The procedure was repeated at inlet pressures of 600, 700 and 800 psi and the crude syrups obtained were analysed for D.E. value and % reducible sugars.

The results obtained are set out in Table 1 below:

TABLE 1

| Bath Temp. | Inlet Press. | % Solids in Prod. | D.E. Value of Prod. | % Reducible Sugars in Prod. |
|---|---|---|---|---|
| 225° C | 500 | 62.1 | 72.2 | 50.4 |
| 225° C | 600 | 61.3 | 71.1 | 49.0 |
| 225° C | 700 | 62.0 | 70.1 | 48.8 |
| 225° C | 800 | 59.8 | 65.4 | 43.9 |

Figure 3:
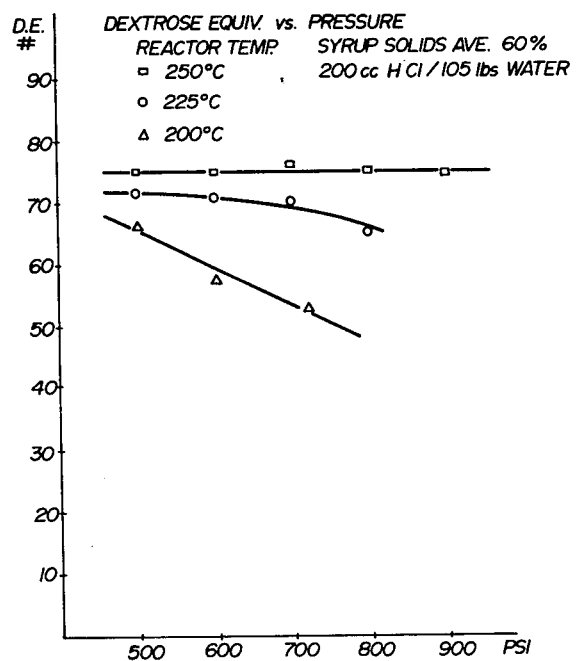
FIG. 3 is a plot of dextrose equivalent values v. pressure for several of the products made in accordance with this invention.

As can also be seen more graphically from FIG. 3, at a temperature of 225° C. the DE is only slightly affected by increasing pressure in the range of 500 to 700 psi, while the DE begins to fall quite quickly when the pressure reaches 800 psi.

EXAMPLE 2

The same starch slurry and apparatus were used as in Example 1 but with a higher bath temperature of 250° C. All other conditions remained without change except the pressure which was varied between 500 and 900 psi. The results are shown in Table 2 below:

TABLE 2

| Bath Temp. | Inlet Press. | % Solids in Prod. | D.E. Value of Prod. | % Reducible Sugars in Prod. |
|---|---|---|---|---|
| 250° C | 500 | 64.4 | 74.3 | 53.8 |
| 250° C | 600 | 63.4 | 73.7 | 52.5 |
| 250° C | 700 | 60.8 | 76.5 | 52.3 |
| 250° C | 800 | 60.3 | 75.6 | 51.2 |
| 250° C | 900 | 57.9 | 74.9 | 57.9 |

As can best be seen from FIG. 3, a constant DE value of about 75 was maintained over the pressure range, indicating that pressure had substantially no affect on DE values at a processing temperature of 250° C.

EXAMPLE 3

The same starch slurry and apparatus were used as in Example 1 but with a lower bath temperature of 200° C. All other conditions were unchanged with the pressure varying between 500 and 800 psi. The results are shown in Table 3 below:

TABLE 3

| Bath Temp. | Inlet Press. | % Solids in Prod. | D.E. Value of Prod. | % Reducible Sugars in Prod. |
|---|---|---|---|---|
| 200° C | 500 | 56.6 | 67.1 | 42.7 |
| 200° C | 600 | 56.2 | 57.2 | 36.1 |
| 200° C | 700 | 55.4 | 52.6 | 32.7 |
| 200° C | 800 | 59.9 | 31.8 | 21.4 |

As will be seen from FIG. 3, at a temperature of 200° C., the D.E. value drops very rapidly with increasing pressure.

EXAMPLE 4

A starch slurry was formed from 100 pounds pearl corn starch, 105 pounds water and 240 mls. of hydrochloric acid (37% HCl).

Using the same reaction described in Example 1, the above slurry was pumped through at a reactor tube inlet pressure ranging from 500–900 psi and a bath temperature of 190° C. The flow rate through the reactor was about 1.3 Imperial gallons per minute. The results obtained are shown in Table 4 below:

TABLE 4

| Bath Temp. | Inlet Press. | D.E. Value of Prod |
|---|---|---|
| 190° C | 500 | 53.7 |
| 190° C | 600 | 53.2 |
| 190° C | 700 | 43.8 |
| 190° C | 800 | 27.2 |
| 190° C | 900 | — |

EXAMPLE 5

A starch slurry was formed from 100 pounds pearl corn starch, 105 pounds water and 220 mls. of hydrochloric acid (37% HCl).

Using the same reactor described in Example 1, the above slurry was pumped through at reactor tube inlet pressures of 500–900 psi and bath temperatures of 190°, 200° and 210° C. The flow rate through the reactor was about 1.3 g.p.m.

Figure 4:
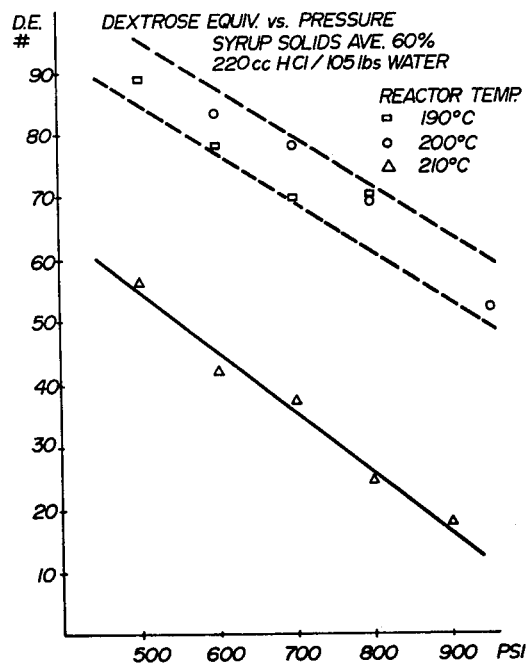
FIG. 4 is an additional plot of D.E. values v. pressure.

The results obtained in the above series of tests have been plotted in FIG. 4. This indicates that the D.E. values decrease with increasing pressures in a similar manner at different reactor temperatures. It also shows that the D.E. values decrease very quickly at reaction temperatures below 200° C.

EXAMPLE 6

A starch slurry was formed from 100 pounds pearl corn starch, 105 pounds water and 240 mls. of hydrochloric acid (37% HCl).

Using the same reactor described in Example 1, the above slurry was pumped through at a reactor tube inlet pressure ranging from 500–900 psi and a bath temperature of 200° C. The flow rate through the reactor was about 1.3 g.p.m. The results obtained are shown in Table 5 below:

TABLE 5

| Bath Temp. | Inlet Press. | D.E. Value of Prod. |
|---|---|---|
| 200° C | 500 | — |
| 200° C | 600 | 97.9 |
| 200° C | 700 | 95.3 |
| 200° C | 800 | 75.7 |
| 200° C | 900 | 56.9 |

EXAMPLE 7

(a) A starch slurry was formed from 100 pounds pearl corn starch, 105 pounds water and 220 mls. of hydrochloric acid (37% HCl).

Using the same reactor described in Example 1, the above slurry was pumped through at a reactor tube inlet pressure ranging from 600–800 psi and a bath temperature of 225° C. The flow rate through the reactor was about 1.3 g.p.m.

The hydrolysates obtained were analysed for D.E. value as well as for composition in terms of contents of dextrose, maltose, tri-saccharides, tetra-saccharides, and higher saccharides. The results are given in Table 6 below:

TABLE 6

| | | | | PRODUCT ANALYSIS | | | |
|---|---|---|---|---|---|---|---|
| Bath Temp. | Inlet Press. | D.E. | pH | Dextrose % | Maltose % | Tri-saccharide % | Tetra/Penta Saccharide % |
| 225° C | 600 | 78.5 | 3.41 | 67.1 | 22.4 | 9.1 | 0 |
| | 700 | 78.1 | 5.6* | 66.5 | 22.3 | 9.8 | 0 |
| | 800 | 71.9 | 3.1 | 57.8 | 22.8 | 18.1 | 0 |

*Neutralized (b) Comparative Analysis:

As a comparison, a sample of commercial hydrolysed starch was also analysed. The sample was a syrup available from St. Lawrence Starch, Montreal, under the trademark Hidex Glucose, containing 81% solids and rated at a D.E. value of 65. The results of the analyses are given in Table 7 below:

TABLE 7

| | |
|---|---|
| D.E. Value | 60.8 |
| Dextrose % | 37.3 |
| Maltose % | 22.1 |
| Trisaccharide % | 12.1 |
| Tatra/Penta Saccharide % | 28.3 |
| pH | 8.7 |

EXAMPLE 8

A starch slurry was formed from 100 pounds pearl corn starch, 105 pounds water and 182 mls. of hydrochloric acid (37% HCl).

Using the same reactor described in Example 1, the above slurry was pumped through at a reactor tube inlet pressure of 800 psi and a bath temperature of 200° C. The flow through the reactor was about 1.3 g.p.m.

The product obtained was analyzed and the following results were obtained:

TABLE 8

| | |
|---|---|
| D.E. Value | 12.1 |
| Solids % | 46.5 |
| pH | 1.7 |
| Dextrose % | 2.5 |
| Maltose % | 2.3 |
| Trisaccharide % | 2.1 |
| Tetra/Penta Saccharide % | 4.2 |

EXAMPLE 9

A series of trials were run using the same reactor described in Example 1, to determine the effects of different reaction temperatures on D.E. values at a fixed pressure. The starch slurry feed contained pearl corn starch in an amount of 43% solids and was acidified with 136 mls. hydrochloric acid per 100 lbs dry starch.

The pressure at the inlet to the first orifice was maintained at about 750 psi and the slurry temperature at this point was varied between 140° and 157° C. The product was neutralized to a pH of 4.5 to 5.4 using a 10% sodium carbonate solution. After neutralization, the product was filtered through a cloth filter under 27 inches of vacuum, the filter cloth being precoated with diatomatious earth. After filtration, the product was pumped through a series of 3 carbon column, given a final pH adjustment and evaporated to approximately 80% solids.

The results obtained are shown in Table 9 below:

TABLE 9

| Head Press (psi) | 750 | 750 | 700 | 750 | 750 |
|---|---|---|---|---|---|
| Head Temp (° C) | 145 | 157 | 153 | 146 | 140 |
| D.E. after reactor | 40.25 | 62.2 | 52.7 | 40.8 | 27.75 |
| Solids after reactor (%) | 56 | 57 | — | 57 | — |
| Final Product | | | | | |
| D.E. | 38.2 | 67 | 56.7 | 42.4 | 28 |
| Solids (%) | — | — | — | 76.6 | 83 |
| Colour | | Excellent | | | |
| Clarity | | Excellent | | | |

I claim as my invention:

1. A process for producing starch hydrolysates comprising continuously moving an aqueous acidic starch slurry feed containing at least about 35% by weight starch solids through a confined preheat zone at a pressure of at least 300 psi to raise the temperature of the slurry to at least 140° C., continuously forcing the hot fluid mass emerging from the preheat zone through an elongated compressing zone, said elongated compressing zone having a cross-sectional area less than 25% of the cross-sectional area of the preheat zone and a length:diameter ratio of at least 4:1, continuously receiving material emerging from the compressing zone in the form of a fine spray or mist including water vapor in a confined zone of reduced pressure and continuously collecting from said reduced pressure zone a homogeneous starch syrup having a higher solids content than the starch slurry feed, the temperature and pressure within the compressing zone being selectively controlled to provide syrup products of predetermined DE values.

2. A process according to claim 1 which includes moving the starch slurry through at least two compressing zones in series, with the hot fluid mass from the preheat zone being forced under high pressure through a first elongated compressing zone from which it emerges as a fine spray or mist into an intermediate zone of reduced pressure where it forms into a liquid and this liquid is continuously moved through the intermediate zone and is forced under pressure through a second elongated compressing zone from which it again emerges as a fine spray or mist flow into a zone of reduced pressure where it again forms into a liquid.

3. A process according to claim 2 wherein the pressure at the inlet to the first compressing zone is in the range of 500–1000 psi.

4. A process according to claim 3 wherein the pressure drop across a compressing zone is at least 200 psi.

5. A process according to claim 4 wherein water vapor is flashed off during the reaction sufficient to increase the solids content of the product by at least 10% by weight as compared with the feed slurry.

6. A process according to claim 5 wherein a product is obtained containing at least 55% solids.

7. A process according to claim 5 wherein the slurry feed entering the first compressing zone has a temperature of at least 170° C.

8. A process according to claim 5 wherein the pressure drop across the first compressing zone is at least 400 psi.

* * * * *